(12) United States Patent
Spottswood et al.

(10) Patent No.: US 8,112,637 B2
(45) Date of Patent: Feb. 7, 2012

(54) SYSTEM AND METHOD FOR PROGRAMMING A DATA STORAGE DEVICE WITH A PASSWORD

(75) Inventors: Jason Spottswood, Houston, TX (US); Mark A. Piwonka, Tomball, TX (US); Patrick L. Gibbons, Magnolia, TX (US); Scott B. Marcak, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1765 days.

(21) Appl. No.: 11/179,227

(22) Filed: Jul. 12, 2005

(65) Prior Publication Data
US 2007/0016800 A1 Jan. 18, 2007

(51) Int. Cl.
*G06F 21/00* (2006.01)

(52) U.S. Cl. ............ 713/193; 713/189; 713/194; 726/2; 235/382

(58) Field of Classification Search .................. 713/193, 713/182, 183, 164, 194, 189; 380/23, 25; 726/20, 2; 711/103; 455/403; 235/382
See application file for complete search history.

(56) References Cited

U.S. PATENT DOCUMENTS

| | | | | |
|---|---|---|---|---|
| 4,944,008 A * | 7/1990 | Piosenka et al. | ............... | 380/46 |
| 5,182,770 A * | 1/1993 | Medveczky et al. | .......... | 380/283 |
| 5,212,729 A * | 5/1993 | Schafer | ......................... | 713/193 |
| 5,375,243 A * | 12/1994 | Parzych et al. | .................. | 726/17 |
| 5,774,545 A * | 6/1998 | Raghavachari | ............... | 713/189 |
| 5,784,390 A | 7/1998 | Masiewicz et al. | | |
| 5,887,131 A * | 3/1999 | Angelo | .......................... | 726/20 |
| 5,937,423 A * | 8/1999 | Robinson | ...................... | 711/103 |
| 5,953,422 A | 9/1999 | Angelo et al. | | |
| 5,978,578 A | 11/1999 | Azarya et al. | | |
| 5,978,913 A | 11/1999 | Broyles et al. | | |
| 6,073,206 A | 6/2000 | Piwonka et al. | | |
| 6,179,205 B1 * | 1/2001 | Sloan | ........................... | 235/382 |
| 6,192,492 B1 | 2/2001 | Masiewicz et al. | | |
| 6,199,163 B1 * | 3/2001 | Dumas et al. | .................. | 713/183 |
| 6,243,809 B1 | 6/2001 | Gibbons et al. | | |
| 6,405,311 B1 | 6/2002 | Broyles et al. | | |
| 6,463,537 B1 * | 10/2002 | Tello | ............................. | 713/182 |
| 6,467,038 B1 | 10/2002 | Piwonka et al. | | |
| 6,505,278 B1 | 1/2003 | Piwonka et al. | | |
| 6,567,868 B1 | 5/2003 | Tran et al. | | |
| 6,647,512 B1 | 11/2003 | James et al. | | |

(Continued)

FOREIGN PATENT DOCUMENTS

WO WO 03/046701 6/2003

OTHER PUBLICATIONS

Peter T. McLean; Information Technology—AT Attachment with Packet Interface—6 (ATA/ATAPI-6); T13 1410D; Jun. 26, 2001; pp. 35-41.

*Primary Examiner* — Ellen Tran
*Assistant Examiner* — Thong Truong

(57) ABSTRACT

There is provided a system and method for programming a data storage device with a password. Specifically, there is provided a method comprising initiating a password programming routine for a data storage device, and programming the data storage device with the password associated with an external storage medium, wherein the data storage device is configured to condition access to the data stored on the data storage device based on the password.

22 Claims, 2 Drawing Sheets

U.S. PATENT DOCUMENTS

| | | |
|---|---|---|
| 6,754,793 B2 | 6/2004 | Piwonka et al. |
| 6,832,320 B1 | 12/2004 | Broyles et al. |
| 7,111,321 B1 * | 9/2006 | Watts et al. .................. 726/2 |
| 2002/0010827 A1 * | 1/2002 | Cheng ........................ 711/103 |
| 2002/0106998 A1 * | 8/2002 | Presley et al. ............... 455/403 |
| 2003/0070099 A1 * | 4/2003 | Schwartz et al. ............ 713/202 |
| 2003/0088780 A1 * | 5/2003 | Kuo et al. .................... 713/185 |
| 2003/0097580 A1 * | 5/2003 | Chang ......................... 713/194 |
| 2003/0097585 A1 | 5/2003 | Girard |
| 2003/0120918 A1 * | 6/2003 | VanDer Kamp ............. 713/164 |
| 2005/0138390 A1 * | 6/2005 | Adams et al. ................ 713/185 |
| 2006/0272027 A1 * | 11/2006 | Noble .......................... 713/193 |

* cited by examiner

SYSTEM AND METHOD FOR PROGRAMMING A DATA STORAGE DEVICE WITH A PASSWORD

BACKGROUND

This section is intended to introduce the reader to various aspects of art, which may be related to various aspects of the present invention that are described and claimed below. This discussion is believed to be helpful in providing the reader with background information to facilitate a better understanding of the various aspects of the present invention. Accordingly, it should be understood that these statements are to be read in this light, and not as admissions of prior art.

Over the past few years, computers and computer-related technologies have become an integral part of the lives of more and more people. Many people now rely on computers for a variety of tasks, such as shopping, investing, and/or banking. Often times, however, using a computer to perform these tasks involves storing sensitive information on a user's computer, a service provider's computer, or both. Once stored, this information can be vulnerable to exploitation by unscrupulous people.

For this reason, many data storage devices, such as Advanced Technology Attachment ("ATA") hard disk drives, have been designed to with embedded security features, such as passwords. For example, many ATA hard drives support a feature called "ATA Security" that enables an individual ATA hard drive to require a password to be entered before the data stored on the hard drive can be accessed. Once a password is programmed into the hard drive, the hard drive will only grant access to the data if the correct password is entered, even if the hard drive is removed from one computer and installed in a different computer. In this way, the password protection may prevent unscrupulous people from stealing data storage devices and exploiting the information stored on them.

However, as security technologies have improved, the ways to defeat or circumvent the security technology have also improved. Whereas several years ago, a six or eight character password was generally considered to provide adequate protection, modem code breaking technologies are now able to quickly "crack" passwords of this length. For this reason, many modem security systems are moving to longer passwords, often twenty-eight or more characters for example. Further, most security systems recommend using randomly generated passwords to prevent unscrupulous people from guessing a password. Unfortunately, remembering twenty-eight random characters can be fairly difficult and forgotten passwords can result in irrecoverable data.

An improved system for managing data storage device passwords would be desirable.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention are directed toward a system or method for programming a data storage device, such as an ATA hard drive, with a password from an external storage medium, such as a smart card. Specifically, in one embodiment, a computer system may initiate a password programming routine for a data storage device, download a password from an external storage medium, and program the data storage device with the password. In another embodiment, the computer system may be configured to download a password from an external storage medium, such as smart card, and to grant access to data stored on a data storage device, such as an ATA hard drive, if the downloaded password matches a password programmed into the data storage device.

Figure 1:
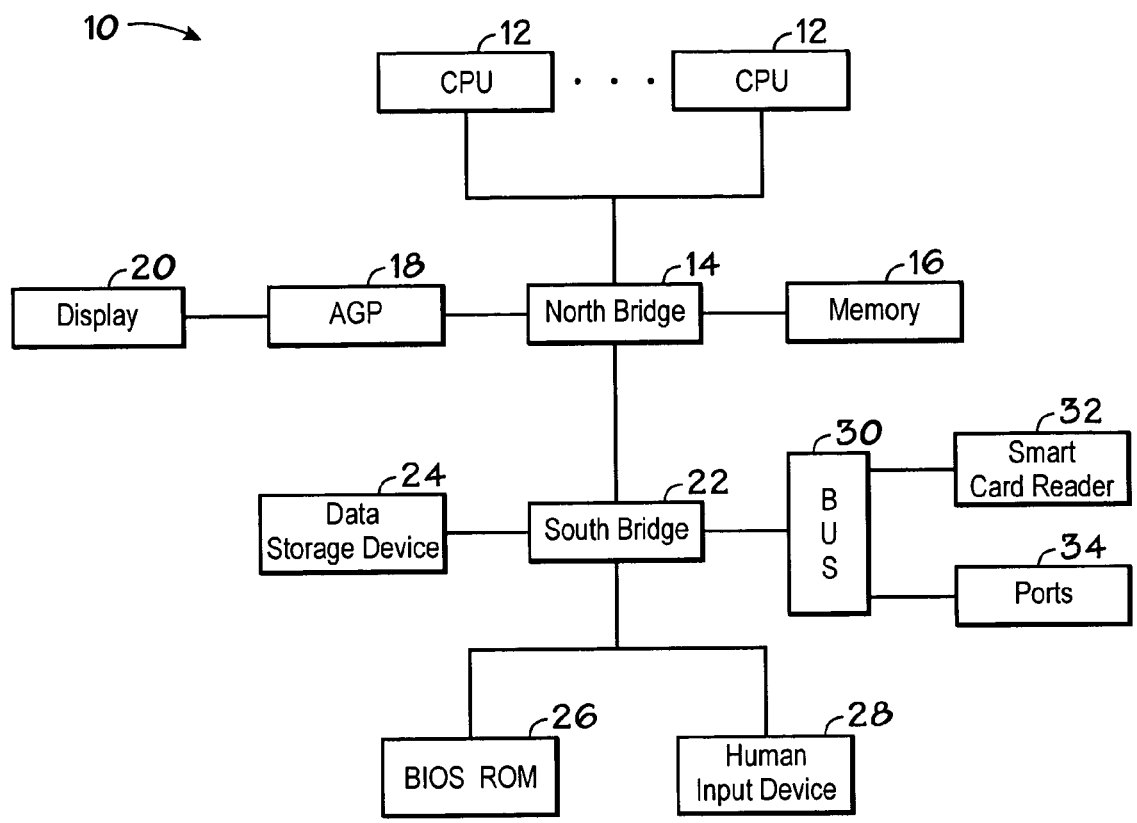
FIG. 1 is a block diagram illustrating an exemplary computer system configured to program a data storage device with a password in accordance with embodiments of the present invention.

Turning now to FIG. 1, a block diagram of an exemplary computer system configured to program a data storage device with a password in accordance with an exemplary embodiment is illustrated and generally designated by a reference numeral 10. The computer system 10 may include one or more processors or central processing units ("CPUs") 12. While the CPU 12 will be referred to primarily in the singular, it will be understood that a computer system 10 with any number of physical or logical CPUs 12 may be implemented. Examples of suitable CPUs 12 include the Intel Pentium 4 Processor and the AMD Athlon Processor.

The CPU 12 may be communicatively coupled to a north bridge 14, such as an Intel 82451NX Memory and I/O Bridge Controller (MIOC). The north bridge 14 may be an interface (either directly or indirectly) between the CPU 12 and the rest of the components of the system 10. The north bridge 14 may contain a memory controller for accessing a main memory 16 (e.g., dynamic random access memory ("DRAM")). The north bridge 14 may also be communicatively coupled to an accelerated graphics port ("AGP") 18. The AGP 18 can transmit video data through an AGP video card (not shown) to a video display 20, which can display the video data for a user.

The north bridge 14 may also be communicatively coupled to a south bridge 22. The south bridge 22 is an integrated multifunctional component, such as the Intel 82371 (a.k.a. PIIX4). The south bridge 22 may include a controller which may enable the south bridge 22 to communicate and/or control a data storage device 24. The data storage device 24 may be configured to support a security feature that enables the data storage device 24 to be programmed with a password and, once programmed, to condition access to the data stored on the data storage device 24 based on correct entry of the password. In one embodiment, the data storage device 24 may be configured to encrypt the data stored on the data storage device 24 using the programmed password as an encryption key.

It will be appreciated that the data storage device 24 may include any one of a variety of suitable data storage devices. For example, in one embodiment, the data storage device 24 is an ATA hard drive. In alternate embodiments, the data storage device 24 may be a small computer system interface ("SCSI") drive or a fibre channel drive. In still other embodiments, the date storage device may be a solid state data storage device or optical data storage device and the data storage device 24 may be replaced by solid state storage or an optical disk, as appropriate. Moreover, in still other embodiments, the data storage device 24 may be communicatively coupled to the computer system 10 in an alternate location, such as through an expansion bus 30. For example, the data storage device 24 may include an IEEE-1394 or USB external storage device that communicates via the expansion bus 30.

The south bridge may also be communicatively coupled to a basic input/output system ("BIOS") read-only memory ("ROM") 26 and to a variety of human input devices 28, such as a keyboard and/or a mouse. Further, while not illustrated in FIG. 1, the south bridge 22 may also include an enhanced direct memory access ("DMA") controller; an interrupt controller; a timer; a universal serial bus ("USB") host controller for providing a universal serial bus (not shown); and an industry standard architecture ("ISA") bus controller for providing an ISA bus (not shown).

The south bridge 22 may also be communicatively coupled to an expansion bus 30. The expansion bus 30 may permit the addition of expansion cards into the computer system 10. The expansion bus 30 may employ any one of a number of suitable expansion bus technologies, including Peripheral Component Interconnect ("PCI"), PCI-X, PCI express, and the like. As such, it will be appreciated that PCI, PCI-X, and PCI express are merely exemplary, and in alternate embodiments, other suitable expansion bus technologies may be employed as well.

Figure 2:
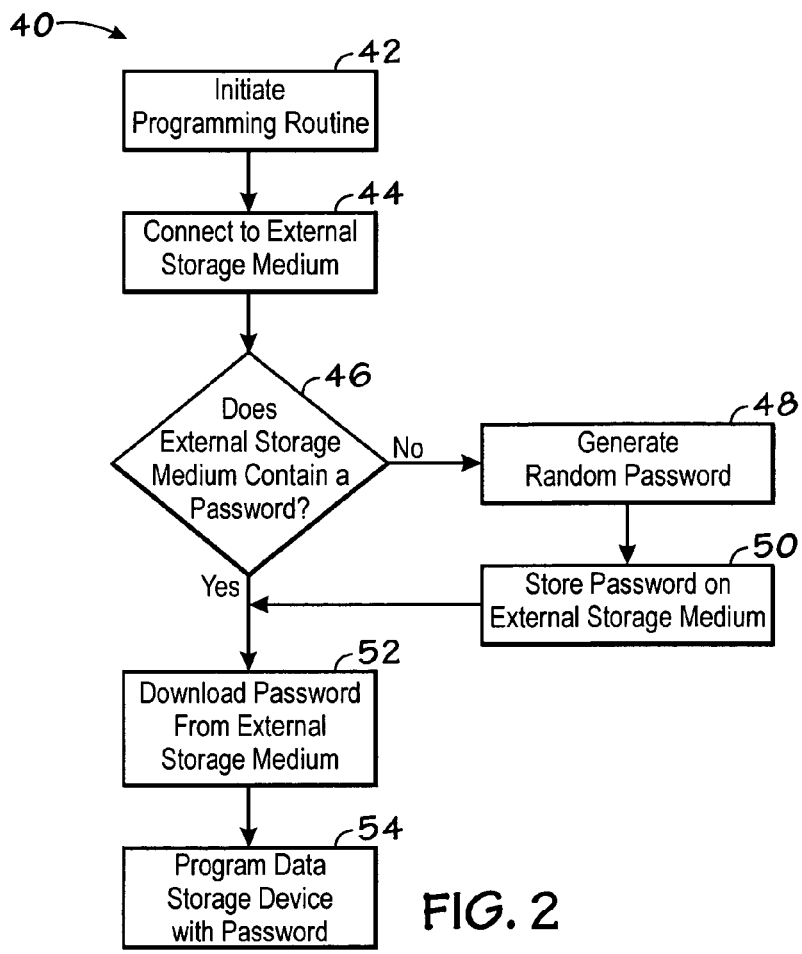
FIG. 2 is a flow chart illustrating an exemplary technique for programming a data storage device with a password from an external storage medium in accordance with embodiments of the present invention.
Figure 3:
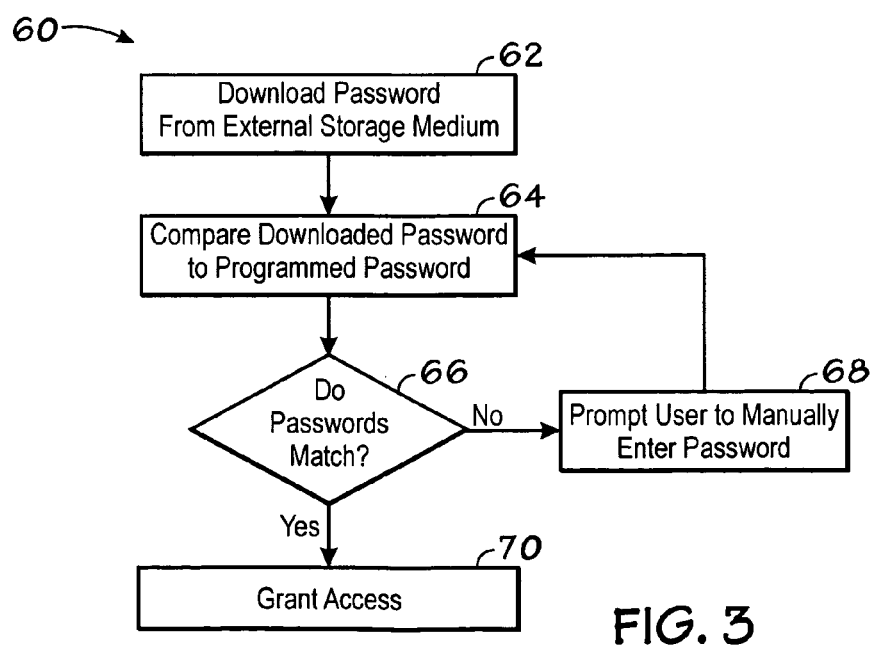
FIG. 3 is a flow chart illustrating an exemplary technique for conditioning access to a data storage device based on a password stored on an external storage medium in accordance with embodiments of the present invention.

As will be described in greater detail below with regard to FIGS. 2 and 3, the computer system 10 may be configured to generate and store a password on an external storage medium, program the data storage device 24 with a password downloaded from the external storage medium, and/or condition access to the data stored on the data storage device 24 based on a password stored on the external storage medium. In various embodiments, the external storage medium may include a smart card, a memory card or stick, a solid state or semiconductor memory device, such as a USB flash drive, a personal digital assistant, such as an iPAQ, a diskette, an optical medium, a wireless device, a Bluetooth-enabled device, or any other suitable form of external storage media that can be communicatively coupled to the computer system 10. For example, the external storage medium may be a memory card including a rigid body (e.g., a plastic body) affixed to a tangible machine readable medium, such as a semiconductor memory, which may be configured to store a password suitable for securing a hard drive.

Returning to FIG. 1, the expansion bus 30 may be communicatively coupled to a smart card reader 32. In one embodiment, the smart card reader 32 is configured to read information, such as a password, from an external storage medium on a smart card (e.g., a semiconductor memory disposed within the smart card). It will be appreciated that a smart card may be a card-shaped medium that contains an embedded microprocessor and/or semiconductor memory to enable the smart card to store data, such as a password. In one embodiment, the smart card may store a randomly generated 32-byte (64 character) password that can be downloaded off the smart card by the card reader 32. As will be described further below with regard to FIG. 2, the computer system 10 may be configured to program the data storage device 24 using a password downloaded from the smart card by the smart card reader 32.

The expansion bus 30 may also be communicatively coupled to one or more ports 34. The ports 34 may include a Universal Serial Bus ("USB") port, an IEEE-1394 port, or another suitable type of port. In addition, the ports 34 may also include or be communicatively coupled to a wireless transceiver, such as a Bluetooth transceiver or I.E.E.E. 802.11 transceiver, capable of be being communicatively coupled wirelessly to the external storage medium. As will be described further below, the ports 34 may be communicatively coupled to an external storage medium, such as a flash memory device (not shown) to facilitate programming of the data storage device 24 using the password stored on the external storage medium. For example, a USB flash drive containing a randomly generated 32-byte password may be plugged into one of the ports 34. In alternate embodiments, the ports 34 and/or the wireless transceiver may be integrated into or communicatively coupled to other components of the computer system 10.

It should be noted that the embodiment of the computer system 10 illustrated in FIG. 1 is merely one exemplary embodiment of a computer system 10. In alternate embodiments, the above described elements may be reconfigured and/or certain elements omitted from the computer system 10. For example, in one alternate embodiment, the north bridge 14 and the south bridge 22 may be replaced by a single integrated chipset. In still another embodiment, the memory 16 may be coupled directly to the CPU 12.

As described above, the system 10 may be configured to program a data storage device, such as the data storage device 24, using a password stored on an external storage medium, such as a smart card, a USB flash memory device, a Bluetooth flash memory device, and the like. Accordingly, FIG. 2 is a flow chart illustrating an exemplary technique 40 for programming a data storage device with a password stored on an external storage medium in accordance with one embodiment. In one embodiment, the computer system 10 may execute the technique 40 to program the data storage device 24 with a password.

As illustrated, the computer system 10 may initiate a programming routine, as indicated in block 42. In one embodiment, initiating the programming routine may involve running a software program on the computer system 10. For example, in one embodiment, a user may command the computer system 10 to execute instructions stored on the BIOS ROM 26 to program the data storage device. In another embodiment, a user may execute a software program within the computer system's software operating system. In yet another embodiment, the computer system 10 may automatically execute the programming routine during a power-on self test ("POST") or when the computer system first accesses a data storage device 24 that is password protectable but not yet programmed with a password.

After initiating the programming routine, the computer system 10 may connect to the external storage medium through the smart card reader 32, the ports 34, or another suitable connection, as indicated by block 44. If the computer system 10 is unable to connect to an external storage medium, the computer system 10 may prompt a user to couple an external storage medium to the computer system 10 (not shown). After connecting to the external storage medium, the computer system 10 may determine whether the external storage medium contains a password suitable for programming the data storage device 24, as indicated by block 46. If the external storage medium does not contain a password, the computer system 10 may be configured to generate a random or pseudo-random password using a random number generated within the computer system 10 and to store the generated password on the external storage medium, as indicated in blocks 48 and 50. In alternate embodiments, the computer system 10 may use alternate techniques for generating the password (e.g., prompting a user to enter a password).

The computer system 10 may next download the password from an external storage medium and store the password in the computer system's 10 memory, as indicated in block 52. In various embodiments, the computer system 10 may copy the password from the semiconductor memory on a smart card, from a flash memory device plugged into one of the ports 34, from an external storage medium communicatively coupled to computer system 10 via a wireless transceiver coupled to the one of the ports 34, and so forth. In addition, if the computer system generated the password (i.e., blocks 48 and 50 described above), the password may already be stored in the computer system's 10 memory—obviating the motivation to download the password from the external storage medium. The password downloaded from the external storage medium may be any suitable form of password or encryption key. For example, the password may be a 128-bit encryption key or a 32-byte encryption key. Furthermore, the external storage medium may also be configured to cause the computer system 10 to prompt a user for a personal identification number ("PIN") before allowing the computer system 10 to download the password from the external storage medium.

After downloading the password for the external storage medium, the computer system 10 may program the data storage device 24 with the downloaded password, as indicated in block 54 For example, the computer system may copy the password into a memory location on the data storage device that is designated to store the password and enable password protection/encryption of the data storage device 24. In one embodiment, the computer system 10 may execute instructions stored on the BIOS ROM 26 to program the data storage device 24 with the downloaded password. In alternate embodiments, the computer system 10 may execute instructions stored elsewhere in the computer system 10 to program the data storage device 24 with the password.

Once the data storage device 24 has been programmed, the data storage device 24 may be configured to condition access to the data stored on the data storage device 24 based on the password. Accordingly, FIG. 3 is a flow chart illustrating an exemplary technique 60 for conditioning access to the data storage device based on a password stored on an external storage medium in accordance with one embodiment. In one embodiment, the computer system 10 may execute instructions stored on the BIOS ROM 26 to perform the technique 50 during a power-on self test ("POST") procedure of the computer system 10. In alternate embodiments, the computer system 10 may execute the technique 60 at other suitable times, such as when a data storage device 24 that has been programmed with a password is first coupled to the computer system 10. For example, the computer system may execute a software program including the technique 60 when a password-protected USB hard drive is coupled to the computer system 10.

The technique 60 may begin by downloading a password from the external storage medium, as indicated by block 62. In various embodiments, downloading the password may involve reading the password from a smart card coupled to the smart card reader 32 or reading the password from a flash memory device communicatively coupled to one of the ports 34. In addition, while not illustrated in FIG. 3, if an external storage medium storing a password is not coupled to the computer system 10, the computer system 10 may prompt a user to connect or couple an external storage medium to the computer. The computer system 10 may then compare the downloaded password to the password programmed into the password protected data storage device (e.g., in FIG. 1, the data storage device 24), as indicated by block 64. In various embodiments, this comparison may be performed by the data storage device 24, by software/firmware running on the computer system 10, or by another suitable component. In one embodiment, the data storage device 24 may be configured to execute instructions stored on the data storage device 24 to perform the comparison.

If the downloaded password and the programmed password do not match (block 66), the computer system 10 may prompt a user to enter a password manually, as indicated by block 68. In this way, if the external storage medium becomes defective, the user has the option of gaining access to the stored data by manually entering the password. If the user does choose to enter a password manually, the technique 60 may return to block 64. However, returning to block 66, if the downloaded password matches the programmed password, the data storage device 24 may grant the computer system 10 access to the stored data. In one embodiment, the computer system 10 may be configured to use the password as an encryption key to decode encrypted data on the data storage device 24.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed:

1. A method comprising:
   initiating a password programming routine for a data storage device;
   determining whether an external storage medium comprises a password corresponding to the data storage device, and if the external storage medium does not comprise the password, generating the password and storing the password on the external storage medium;
   receiving the password from the external storage medium;
   automatically encrypting data stored on the data storage device with the password via the password programming routine; and
   automatically programming the data storage device with the password via the password programming routine, wherein the data storage device is configured to condition access to the data stored on the data storage device based on the password.

2. The method, as set forth in claim 1, comprising:
   generating a password using a random number generator; and
   storing the generated password on the external storage medium, wherein programming the data storage device comprises programming the data storage device with the generated password.

3. The method, as set forth in claim 1, wherein receiving the password comprises downloading the password from the external storage medium.

4. The method, as set forth in claim 3, wherein downloading the password comprises downloading the password from a semiconductor memory.

5. The method, as set forth in claim 4, wherein downloading the password comprises downloading the password from a smart card.

6. The method, as set forth in claim 4, wherein downloading the password comprises downloading the password from a universal serial bus flash memory device.

7. The method, as set forth in claim 1, wherein the data storage device is an Advanced Technology Attachment (ATA) hard drive with an ATA Security password comprising the password received from the external storage medium.

8. The method, as set forth in claim 1, wherein the password comprises a 32-byte password.

9. A computer configured:
to initiate a password programming routine for a hard drive;
to determine whether an external storage medium comprises a password corresponding to the drive, and if the external storage medium does not comprise the password generate the password and store the password on the external storage medium;
to download the password from the external storage medium; and
to program the hard drive with the password, wherein the hard drive is configured to condition access to the data stored on the hard drive based on the password.

10. The computer, as set forth in claim 9, comprising a smart card reader, wherein the computer is configured to download the password from a smart card.

11. The computer, as set forth in claim 9, comprising a universal serial bus port, wherein the computer is configured to download the password via the universal serial bus port.

12. The computer, as set forth in claim 9, comprising a wireless transceiver, wherein the computer is configured to download the password via the wireless transceiver.

13. The computer, as set forth in claim 9, comprising a tangible machine readable medium storing:
code adapted to initiate a password programming routine for a data storage device;
code adapted to download a password from an external storage medium; and
code adapted to program a data storage device with the password, wherein the data storage device is configured to condition access to the data stored on the data storage device based on the password.

14. The computer, as set forth in claim 13, wherein the tangible medium comprises a BIOS ROM.

15. A method comprising:
downloading a password from an external storage medium;
comparing the downloaded password to a password programmed into a data storage device, wherein the data storage device is configured to condition access to the data stored on the data storage device based on the password;
prompting a user to manually enter a password if the downloaded password from the external storage medium does not match the password programmed into the data storage device, and comparing the user-entered password to the password programmed into the data storage device; and granting access to the data stored on the data storage device if the downloaded password or the user-entered password matches the password programmed into the data storage device.

16. The method, as set forth in claim 15, wherein comparing the downloaded password comprises comparing the downloaded password to an Advanced Technology Attachment (ATA) Security password of an ATA hard drive.

17. The method, as set forth in claim 15, wherein comparing the downloaded password comprises comparing a password downloaded from a smart card to an Advanced Technology Attachment (ATA) Security password of an ATA hard drive.

18. The method, as set forth in claim 15, wherein comparing the downloaded password comprises comparing a password downloaded from a universal serial bus flash memory device.

19. A method comprising:
coupling an external storage medium to a computer associated with a data storage device;
initiating a routine to protect the data storage device, the routine comprising:
determining that the external storage medium does not comprise a password; and, in response to the external storage medium not comprising a password:
generating a password using a random number generator;
storing the generated password on the external storage medium; and
using the generated password to encrypt the data storage device.

20. The method, as set forth in claim 19, wherein the routine further comprises using the generated password to program an Advanced Technology Attachment (ATA) Security feature of the data storage device, wherein the data storage device comprises an ATA hard drive.

21. A method comprising:
coupling a data storage device to a computer system;
coupling an external storage medium to the computer system, wherein the external storage medium contains a tangible machine readable medium configured to store a password;
determining, via a programming routine of the computer system, whether the external storage medium contains the password;
if the external storage medium contains the password, reading the password off the external storage medium;
if the external storage medium does not contain the password, generating the password and storing the password to the external storage medium;
programming the data storage device with the password contained in the external storage medium to condition access to the storage device based on the password; and
accessing data stored on the data storage device by using the password.

22. The method, as set forth in claim 21, wherein the password is an ATA security password associated with an ATA security feature of the data storage device, and wherein the ATA security feature conditions access to data stored on the data storage device based on the password.

* * * * *